Patented Oct. 9, 1934

1,976,132

UNITED STATES PATENT OFFICE 1,976,132

PORTLAND CEMENT MANUFACTURE

Harry McCaig Larmour and Stephen C. Pierce, Jr., Merced, Calif.

No Drawing. Application April 15, 1931, Serial No. 530,434

7 Claims. (Cl. 106—25)

In the normal procedure of manufacturing Portland cement suitable argillaceous and calcareous materials are ground and mixed in proper proportion, then heated to incipient fusion causing the formation of clinkers. The clinkers are then cooled and mixed with a portion of gypsum (or derivative of the same) and ground to a fineness of 78% or more passing through the 200 mesh sieve, which resultant product is the cement.

That certain difficulties are encountered in such a procedure is evidenced in the resulting cements produced, particularly those produced under certain grinding conditions and also are they evidenced by the variety of grinding machinery on the market and in use in the industry.

Under ideal conditions a cement is produced which has a normal initial set of from one to three or four hours, a strength of standard specification or a little higher, a reasonable plasticity, a fineness of 78–90% passing the 200 mesh and a set behavior wherein the material remains soft for a time and then proceeds to harden uniformly with respect to both mass and time.

Under less favorable conditions which are usually noted in the case of high grinding temperatures the above conditions may not prevail and the following difficulties in the resultant cement may be, and frequently are, present. The cement develops a so-called "hang set" or "jell" wherein the paste mixed for the purpose of determining the set hardens nearly to an initial set and then remains in that state for a period of one or more hours. This condition of hang set, grab set, or jell is legitimate in the matter of specification but is not entirely satisfactory in concrete. In addition to this difficulty the grinding mill may have a tendency to plug or coat with a normal feed and more especially if a special fineness of 90% or better through the 200 mesh is desired. The coating of the grinding media and the mill destroy the grinding efficiency of the mill and prevent the obtaining of desired fineness. Under these conditions unsatisfactory strengths prevail and at the same time the cement, when tempered with water for the purpose of making concrete, has the tendency to generate heat and often an excessive amount of heat which in turn prevents the formation of a hard and durable concrete but instead makes for a soft and chalky concrete which, to the engineer and contractor, is known as "burning up" the concrete. The condition is not often of real danger in small bodies of concrete but is particularly manifested in large masses.

Various expedients have been practiced to prevent these conditions, such as air swept mills, water cooled mills, precooling of the material before introducing into the mill, and even adding water into the mill up to the point almost reaching absorption to maintain low temperature. In other words, the difficulties are all attributed to temperature of the resulting cement on discharge from the grinding mill.

In our own experimental work it has been found that temperature is not the fundamental cause, but rather, in some cases, a contributing factor to the situation. The real situation, according to our results, being that the cement, for satisfactory conditions in the matter of grinding, must contain at least a certain amount of combined water in order that a part of the exothermic reaction with the water may be expended before tempering the material for the production of concrete.

Our first experimental work of this nature was with a small mill some 12 inches in diameter and 20 inches long which was charged with either rods or balls to the extent of 100 pounds and then charged with clinker in the amount of 20 to 25 pounds and gypsum or other derivative in the amounts desired. The mill was then closed with a door which was bolted against a gasket rendering the mill, nearly at least, air tight, with the result that all moisture contained in the clinker and the gypsum must remain in the mill and would, if liberated as steam, have to be reabsorbed by the cement in the course of hydration of the finest and most active particles produced in the grinding action. In addition to maintaining the moisture in the mill it will be noted that the pressure will be at least as high, if not higher than, normal pressure due to the saturation of the contained air.

Grinding under the above condition it was impossible to produce a fast or abnormal set with a well burned clinker regardless of the time the material was ground. (Grinding time in the closed mill corresponds to feed rate in a continuous mill. A long grinding time is equivalent to grinding with a low feed in a continuous mill.)

The work was then further carried on in a larger closed mill some 30 inches in diameter by 48 inches long and 250 pound batches of cement were produced. The conditions in the larger mill were essentially the same as those of the smaller one. The charging door was bolted against a gasket rendering the mill substantially air tight and preventing pressure reduction and to a certain extent building up a positive pressure.

The cement produced was of a normal and satisfactory nature in the matter of set, heat of hydration, strength and other physical and chemical properties of Portland cement. In addition, the grinding media and mill walls remained clean so that the grinding was efficiently carried on regardless of the time which the material was ground.

It was then attempted to duplicate these results under commercial conditions in a continuous mill (a 7′ x 26′ compeb) and difficulties were encountered as the temperature of course rose as the feed rate of the mill was lowered on account of the increased energy, in proportion to the material being carried out of the mill. The grinding system soon reached a temperature where the water was driven off of the clinker and the gypsum, converted to steam and immediately discharged from the mill due to the natural draft induced by the differential in temperature between the feed and discharge ends of the grinding unit.

The result was that the combined water in the resultant cement was low and the cement was unsatisfactory from the standpoint of setting time, strength, nature of set and heat of setting and hardening. The strength did not increase as the feed was decreased to the mill as was the case when the grinding time in the closed mill was increased.

The only chemical difference between the cement produced in the closed mill and the continuous mill was the combined water being about .65% in the continuous mill and 1.75 to 2.00% in the closed mill. Further tests proved that the satisfactory cement could be produced in the large commercial unit provided the combined water was maintained at 1% or more but that best results were obtained with 2% or more. It therefore seemed a logical conclusion that the difference in grinding conditions between the continuous mill and the closed mill was in the fact that the stabilized condition of pressure in the latter equal to or in excess of atmospheric pressure maintained a desired combined water in the resulting cement not normally obtained in the continuous unit when grinding fine. We do not limit ourselves to the amount of combined water we would maintain in the resulting cement but normally would not exceed 3% by weight in that higher amounts will too closely approach the specification limit for ignition loss. Particular purposes will likely prove a larger amount desirable.

The question of maintaining the desired water combination must be answered and a process for this purpose is the specification of this invention. Sufficient combined water may be present in the clinker and gypsum when introduced into the mill for desired results but particularly in fine grinding and in the case of high grinding temperatures a large portion of this is driven off. We must then either provide an excess of combined water in the material entering the mill or maintain the water of combination in the mill even though it be converted to steam in the grinding process and, as will later be shown in more detail, both together must be accomplished for best results.

A high addition of gypsum is a partial solution to the problem, in that a large combined water is introduced into the mill with the gypsum and the stability of the water of crystallization is such that is it not liberated at the start of the grinding process but more likely at a point varying from near the discharge at low grinding temperature and approaching the feed end as the mill temperature rises. The actual point of liberation is difficult to determine but is a function controlling coating of the mill and grinding media and is responsible for the so-called static condition of the mill, or the electricity described by some operators as responsible for the adherence of the particles to the grinding media and mill walls.

In any case it has been found by practical trial that high gypsum is only an expedient and, being limited by specifications, is not a real cure for the difficulty. We, therefore, prefer to add some other compound or material carrying a good percentage of water in combination and have found hydrated cement to be excellent for this purpose.

We mix the cement and water in approximately equal volumes and allow the material to set. It is then broken up sufficiently to permit its addition to the grinding mill without mechanical difficulty (approximately 2″ or less). This material is then tested for combined water and added in an amount to constitute an excess of combined water over and above that desired in the resultant cement. We believe that this material retains its water until nearly the discharge point of the grinding unit, just liberating it at a point where the extremely active and unstable particles of the cement are ready to take up the moisture as released. In any event, and regardless of the actual condition in the grinding mill, a highly satisfactory cement is obtained economically and the grinding media remains clean and efficient as a clinker reduction agent for normal mill temperatures and some temperatures in excess of normal operation.

As above suggested, hydrated cement is only one of a class of materials found to be satisfactory to a more or less limited extent, any more or less inert material carrying a large amount of combined water will answer the purpose. Soluble materials are rather unsatisfactory as they are apt to hasten the reaction between the cement and atmospheric moisture causing warehouse set. In the selection of other materials it is essential that sufficient water must be present to give the desired combined water without raising the insoluble residue above specification limits. Diatomaceous earths and some of the volcanic ashes meet the condition to some extent and likewise we find hydrated lime of merit. The latter has the disadvantage, in some cases, of forming an objectional bloom on the concrete. The use of the hydrated cement then becomes the most likely as its cost is low and it introduces no chemical material into the cement other than those already present.

It would seem therefore that our problem was solved, but continuous grinding for long periods of time (say 24 hours duration and longer) at low grinding rates in proportion to the rated capacity of the grinding units in question developed temperatures in excess of those which could be satisfactorily handled. We then found it necessary not only to admit sufficient moisture in the form of available combined water but it was necessary to arrange to control its escape as steam for desired results. To do this we attempted to approach the satisfactory condition found in the closed grinding unit by closing the outlets of the grinding mill and providing for regulation of the steam escape. In the simplest form the end of the mill was closed leaving only a trap for discharge and equipped with a damper. This practice had the effect of changing the grinding condition in the mill from that of a slightly reduced pressure to one of grinding under a slightly positive pressure. The pressure had a two-fold advantage in that it prevented the escape of too much steam and at the same time retarded the reaction which released the combined water from the hydrated cement and gypsum causing partial hydration of the overactive particles of cement.

The scheme of closing the mill and regulating with a damper had only the one objection, that of being difficult to control. We therefore found it necessary for practical mechanical reasons to approach the closed mill condition by another method. We introduced a gas blast into one or both ends of the mill. Introduction into one end of the mill required that the pressure should as nearly as possible balance atmospheric conditions. Introduction of the gas blast into both ends of the mill permits some raise in the pressure due to the fact that the retaining of the steam makes for a heavier atmosphere and the balancing of the draft slightly raises the pressure in itself.

In selecting the gas used air is the most common gas known and for that reason likely to be the one selected although tests have shown neutral and reducing gases to be equally efficient as the oxidizing air. The moisture content of the gas seems to have little effect, probably due to the fact that the gas in the mill is saturated for its condition of temperature at any event.

Our process then, we found, made continuous grinding of a true Portland cement possible with the same degree of mechanical efficiency as the closed mill regardless of temperature and at the same time produced a cement of high strength if desired, with a normal set and low heat liberation on setting and hardening. Either of the two expedients mentioned, regulating the draft or adding the hydrated cement, materially helped the situation but for maximum results it was found necessary to use both phases of the corrective measure. It was found possible to produce a cement desired at any temperature up to 380° F. and that limit is not due to a lowering of quality but is about the limit of linear expansion permissible with the ordinary commercial grinding installation.

Our process, briefly stated, consists of controlling the combined water in cement by means of the addition of hydrated cement to the clinker previous to grinding in amounts necessary to give the proper amount of water and regulating the flow of gases through the mill to induce a pressure in the mill and thereby retain this moisture in the mill for combination with the active part of the cement for stabilization.

We believe that the process is new and novel and to the best of our knowledge it is not being practiced and is opposite to the trend of the times which seem to have as a primary purpose, the induction of draft to carry steam out of a mill rather than the maintaining of it in a grinding mill, and that the tendency is to run low rather than high combined water in the cement.

That it is useful is obvious from the fact that so much more flexibility is added to the operation of the clinker grinding units in cement production.

We claim:

1. The process of maintaining desired residual water content in Portland cement while grinding, which comprises grinding the clinker in a mill at an internal pressure above atmospheric pressure.

2. The process of maintaining desired residual water content in Portland cement while grinding, which comprises grinding the clinker in a mill at an internal pressure above atmospheric pressure maintained by means of a gas blast into the end of the mill in opposition to the draft of the mill.

3. The process of maintaining desired residual water content in Portland cement while grinding, which comprises grinding the clinker in a mill at an internal pressure above atmospheric pressure maintained by opposing gas blasts into opposite ends of the mill.

4. The process of maintaining desired residual water content in Portland cement while grinding, which comprises grinding the clinker in a mill at an internal pressure above atmospheric pressure maintained by opposing the flow of discharge gases from the mill.

5. The process of producing true Portland cement which consists in grinding together Portland cement clinker, gypsum, and previously hydrated Portland cement, the latter in amount sufficient to yield a residual combined water content in the finished cement of from one to three per cent.

6. The process of producing true Portland cement which consists in grinding with the clinker a quantity of previously hydrated Portland cement sufficient to insure a combined water content of the cement as discharged from the mill of at least one per cent.

7. The process of producing Portland cement which comprises grinding together Portland cement clinker, gypsum, and previously hydrated Portland cement, the latter in amount sufficient to yield a residual combined water content in the finished cement of from one to three per cent, all carried out while subjecting the materials to greater than atmospheric pressure.

HARRY McC. LARMOUR.
STEPHEN C. PIERCE, Jr.